(12) United States Patent
Flath

(10) Patent No.: US 10,562,161 B2
(45) Date of Patent: Feb. 18, 2020

(54) TORQUE WRENCH

(71) Applicant: GENERAL ELECTRIC COMPANY, Schenectady, NY (US)

(72) Inventor: Todd Roland Flath, West Chester, OH (US)

(73) Assignee: General Electric Company, Schenectady, NY (US)

( * ) Notice: Subject to any disclaimer, the term of this patent is extended or adjusted under 35 U.S.C. 154(b) by 170 days.

(21) Appl. No.: 15/862,816

(22) Filed: Jan. 5, 2018

(65) Prior Publication Data
US 2019/0210201 A1 Jul. 11, 2019

(51) Int. Cl.
B25B 23/142 (2006.01)
G01L 5/24 (2006.01)
B25B 13/06 (2006.01)

(52) U.S. Cl.
CPC .......... *B25B 23/1425* (2013.01); *B25B 13/06* (2013.01); *G01L 5/24* (2013.01)

(58) Field of Classification Search
CPC ........ B25B 23/1425; B25B 13/06; G01L 5/24
See application file for complete search history.

(56) References Cited

U.S. PATENT DOCUMENTS

| 4,257,263 A | | 3/1981 | Herrgen |
| 4,643,030 A | | 2/1987 | Becker et al. |
| 5,014,794 A | * | 5/1991 | Hansson ................ B23Q 15/08 173/181 |
| 6,234,051 B1 | * | 5/2001 | Bareggi ............. B25B 23/0035 73/862.21 |
| 6,796,190 B2 | * | 9/2004 | Curry ..................... B25B 23/14 73/862.21 |
| 6,948,380 B1 | | 9/2005 | Shiao et al. |
| 7,089,810 B2 | * | 8/2006 | Hsieh ........................ G01L 5/24 73/862.623 |
| 7,263,902 B2 | * | 9/2007 | Hsieh ..................... B25B 13/04 73/862.21 |
| 7,331,246 B2 | | 2/2008 | Escoe et al. |
| 7,392,712 B2 | * | 7/2008 | Hsieh ..................... B25B 13/08 73/862.21 |
| 7,415,897 B2 | * | 8/2008 | Shiao .................. B25B 23/1425 73/862.08 |
| 7,469,619 B2 | * | 12/2008 | Anjanappa .......... B25B 23/0021 73/862.191 |
| 7,819,025 B2 | * | 10/2010 | Coffland ............. B25B 23/1425 73/862.21 |
| 7,841,245 B1 | | 11/2010 | Chen |
| 8,171,828 B2 | * | 5/2012 | Duvan ................ B25B 23/1425 73/862.21 |
| 8,555,755 B2 | * | 10/2013 | Cattaneo ............. B25B 23/0035 81/479 |
| 8,714,057 B2 | | 5/2014 | Anjanappa et al. |
| 8,794,114 B2 | * | 8/2014 | Chiapuzzi ........... B25B 23/1425 73/862.21 |
| 8,844,381 B2 | * | 9/2014 | Gharib ................ B25B 23/1425 73/862.21 |

(Continued)

*Primary Examiner* — David B. Thomas
(74) *Attorney, Agent, or Firm* — McGarry Bair PC

(57) ABSTRACT

A torque wrench for applying a torque to a fastener includes a handle, a user interface carried by the handle, and a fastener drive. The fastener drive can be detachably engaged with the handle and also include a head shaped to receive a fastener. The user interface can indicate an applied torque on the fastener.

20 Claims, 3 Drawing Sheets

(56) References Cited

U.S. PATENT DOCUMENTS

| | | |
|---|---|---|
| 9,085,072 B2 | 7/2015 | Anjanappa et al. |
| 9,256,220 B1* | 2/2016 | Coffland .......... G05B 19/41875 |
| 10,197,422 B2* | 2/2019 | McColgan .......... B25B 23/1425 |
| 2009/0255385 A1* | 10/2009 | Hsieh .................. B25B 23/1425 |
| | | 81/467 |
| 2014/0068909 A1* | 3/2014 | Hsieh .................... B25B 23/142 |
| | | 29/407.02 |
| 2016/0288304 A1 | 10/2016 | Shiao |
| 2017/0225303 A9 | 8/2017 | Wilson, Jr. |

* cited by examiner

TORQUE WRENCH

BACKGROUND

Torque wrenches are often used during assembly of workpieces, including securing fasteners when coupling components. Fasteners, or components to be coupled, can have material limits or otherwise experience undesired deformations when excess torque is applied via the torque wrench. It can therefore be beneficial to have a reliable understanding of an amount of torque applied by the torque wrench.

BRIEF DESCRIPTION

In one aspect, the disclosure relates to a torque wrench for applying a torque to a fastener. The torque wrench includes a handle extending between a first end and a second end, the first end having a handle coupling portion, a user interface carried by the handle and indicating an applied torque on the fastener, and a fastener drive. The fastener drive can include a drive coupling portion configured to detachably engage the handle coupling portion, a head having a fastener seat shaped to receive a fastener, and a sensor located on the head and proximate the seat, the sensor outputting to the user interface a value indicative of the applied torque.

In another aspect, the disclosure relates to a method of indicating an applied torque on an electronic display of a torque wrench having a handle with a detachable fastener drive having a fastener seat. The method includes generating a torque value indicative of the applied torque by a sensor located adjacent the fastener seat, determining an applied torque from the torque value, and displaying the applied torque on the electronic display.

DESCRIPTION OF EMBODIMENTS

Figure 1:
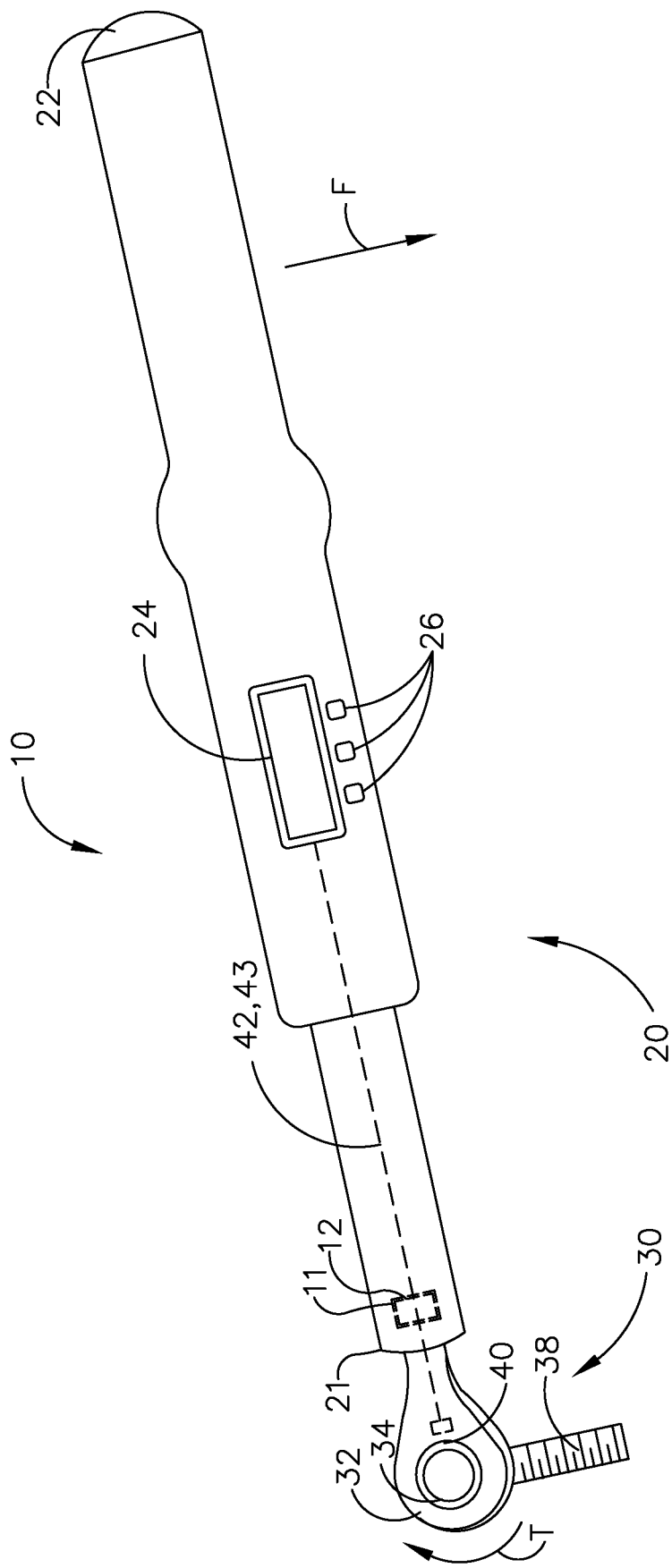
FIG. 1 is a schematic view of an exemplary torque wrench, according to various aspects described herein, acting on an illustrative fastener.

The described embodiments of the present disclosure are directed to a torque wrench. For purposes of illustration, the present disclosure will be described with respect to a torque wrench having an electronic display for illustrating a torque value that is directly or indirectly indicative of the applied torque. It will be understood, however, that the disclosure is not so limited and can have general applicability in a variety of environments, including in analog torque wrenches, as well as in other tools or measurement devices.

Mechanical analog and digital torque wrenches are used throughout assembly and production facilities for assembly of various types of equipment, including aircraft engine assemblies. A torque wrench is a wrench that can precisely set the torque used when tightening a fastener such as a nut or a bolt, and can also provide a user with feedback to indicate when a desired amount of torque has been applied. Traditional torque wrenches can sense an amount of torque by a sensor positioned within a handle of the wrench, or otherwise offset from the workpiece receiving torque applied by the wrench. Such wrenches can include a display or gauge, which can be analog or digital, to provide feedback regarding the amount of torque detected by the sensor. As the sensor and fastener have different lever arms, the sensed torque from the sensor can be mathematically converted to an applied torque on the fastener. One exemplary calculation for converting the sensed applied torque to the actual applied torque is given in Equation (1) below:

$$[\text{Actual applied torque}] = [\text{Sensed applied torque}] \times \frac{R2}{R1} \quad (1)$$

where $R1$ refers to the distance between the applied force and the sensor, and $R2$ refers to the distance between the applied force and the fastener being tightened by the torque wrench.

As used herein, "a set" can include any number of the respectively described elements, including only one element. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates an exemplary torque wrench 10. The torque wrench 10 can include a handle 20, extending between a first end 21 and a second end 22. The first end 21 of the handle 20 can include a handle coupling portion 11. In addition, a user interface 24 can be carried by the handle 20. The user interface 24 is illustrated herein as an electronic user interface 24, and it will be understood that aspects of the present disclosure can be utilized with a variety of user interfaces, including analog indicator displays. Furthermore, other user interface inputs 26 including buttons or switches can be provided on the handle 20 as desired; the inputs 26 can be capable of operations including, but not limited to, adjusting a display brightness or mode, or adjusting a displayed unit such at ft·lb or N·m. It is further contemplated that the user interface 24 can include a touchscreen display.

A fastener drive 30 can include a drive coupling portion 12 configured to detachably engage the handle coupling portion 11, thereby becoming detachably coupled to the handle 20. It is contemplated that the handle and drive coupling portions 11, 12 can include any desired coupling mechanism or connection fitting, including a square drive, strike and catch, magnetic coupler, aperture with locking pin, clamp, or threading, in non-limiting examples.

The fastener drive 30 can further include a head 32 having a fastener seat 34. The fastener seat 34 can be shaped or otherwise configured to receive a fastener 38, including rotary fasteners such as nuts, bolts, self-locking bolts, or any other desired fastener. Furthermore, the head 32 can be any desired head to match the fastener being used. Exemplary heads 32 include an open wrench head, angled wrench head, closed or box wrench head, pivoting wrench, head, socket, or pivoting socket, in non-limiting examples.

A sensor 40 configured to sense torque can be located on the head and can be positioned proximate the fastener seat 34. It is contemplated that the sensor 40 can include any desired sensor including a load cell, strain gauge, static torque sensor, or rotary torque sensor, in non-limiting examples. In addition, the sensor 40 can be in signal communication with the user interface 24 via a signal connection 42; it should be understood that the signal communication between the sensor 40 and the user interface 24 can include other electronic components. The signal connection 42 is illustrated herein as electrically conductive wiring 43, and it should be understood that the signal connection 42 can also include any desired connecting element, including fiber optic cables or a wireless connection via radio frequency identification (RFID) or near-field communication (NFC) devices, in non-limiting examples. The sensor 40 can sense a value 41 indicative of an applied torque T on the fastener, and the value 41 can be outputted to the user interface 24 via the signal connection 42 or wiring 43.

Figure 2:
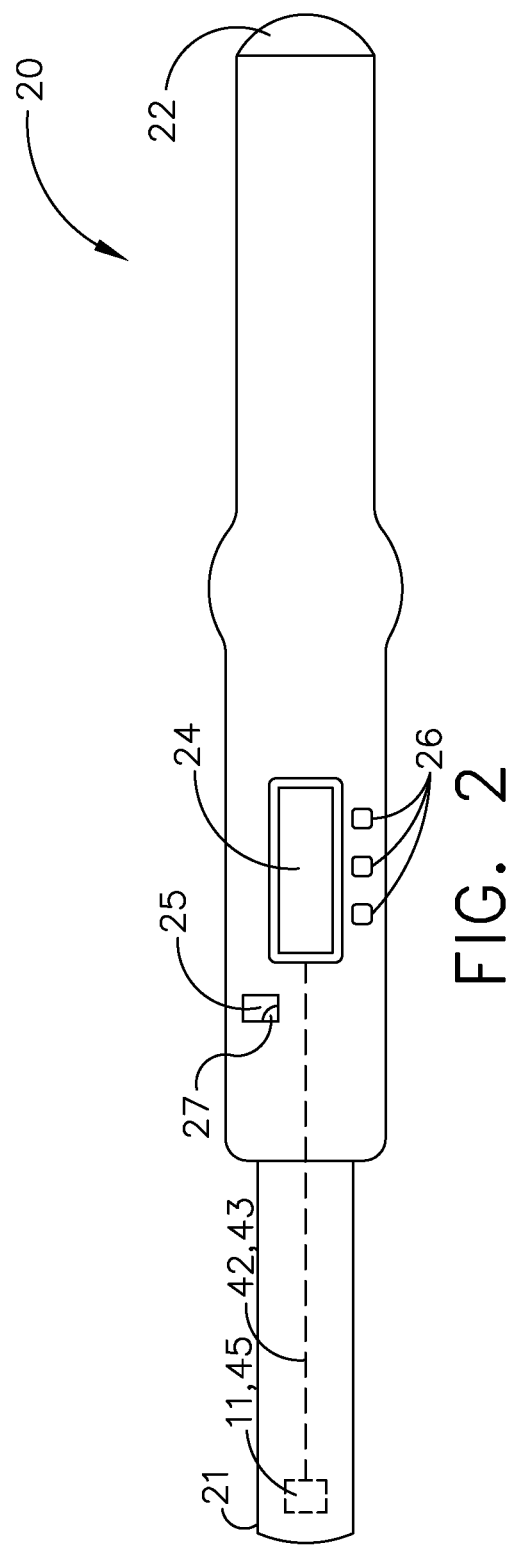
FIG. 2 illustrates a handle of the torque wrench of FIG. 1.

Referring now to FIG. 2, the handle 20 is illustrated in further detail. It is contemplated that a controller module 25 can be disposed in the handle 20 in signal communication with the user interface 24 via the signal connection 42, illustrated in the example of FIG. 2 as wiring 43. The controller module 25 can include a printed circuit board (PCB) with a processor 27 capable of converting a received signal, e.g. a voltage or electromagnetic wave, from the sensor 40 (FIG. 1) into an output value that is directly or indirectly indicative of the applied torque T. For example, an output value directly indicative of the applied torque T could be "18.1 N·m," whereas a non-limiting example of an output value indirectly indicative of the applied torque T could include "The connected fastener is a #8 standard-type fastener, and a sufficient amount of torque has been applied to tighten fasteners of this type." The output value (e.g. "18.1 N·m" or "Sufficiently Tightened") is then displayed on the user interface 24 including, but not limited to, a numerical or other visual indication of the applied torque T (FIG. 1). In another non-limiting example, the processor 27 can verify a successful connection of the handle coupling portion 11 (FIG. 1) and drive coupling portion 12. Additionally, the handle coupling portion 11 can also include a handle electrical conductor 45, including, but not limited to, an aluminium or copper element which can also be in signal communication with either or both of the user interface 24 or the processor 27 via the signal connection 42, such as via the wiring 43.

Figure 3:
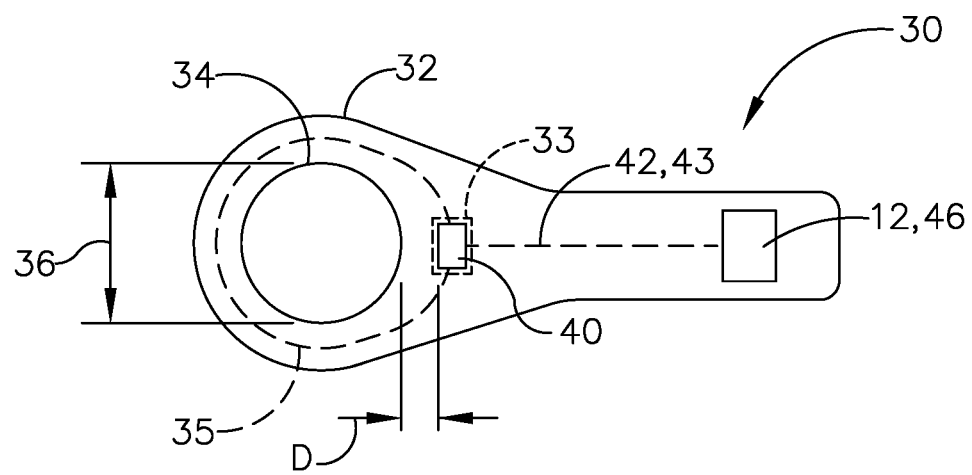
FIG. 3 illustrates a fastener drive which can be utilized in the torque wrench of FIG. 1.

Turning to FIG. 3, the exemplary fastener drive 30 is illustrated with the head 32 having the form of a socket. The sensor 40 can be positioned a small distance D away from the fastener seat 34; it can be appreciated that the fastener seat 34 defines the point of contact between the head 32 and fastener 38 (FIG. 1), and is therefore the point where torque is applied to the fastener 38 from the torque wrench 10. In one non-limiting example, the distance D can be 2 cm or smaller; in another non-limiting example, the distance D can be smaller than 25% of the seat diameter 36. It can be appreciated that the distance D can be preselected based on a type of size of fastener drive 30. In one example, the distance D can be made constant regardless of type or size of fastener drive 30, including a fixed value such as 1 cm. In another example, the distance D can vary based on a type of fastener drive 30 to optimize an installation position of the sensor 40 while still preserving a distance limit including, but not limited to, keeping the distance D smaller than a percentage of the seat diameter 36.

The head 32 can also include a recess 33 proximate the fastener seat 34 as shown. The sensor 40 can be positioned at least partially within the recess 33; it is contemplated that the sensor 40 can be positioned fully within the recess 33, embedded within the fastener drive 30 and hidden from outside view, or the sensor 40 can also be partially within the recess 33 and retained by a cap (not shown), in non-limiting examples. Additionally, an inner drive ring 35 can be embedded within the fastener seat 34A and mechanically coupled to the sensor 40. The inner drive ring 35 can be configured to transfer applied torque T (FIG. 1) through the fastener seat 34 and to the sensor 40, which can improve the accuracy of the torque measurement made by the sensor 40.

The drive coupling portion 12 can further include a drive electrical conductor 46 including, but not limited to, an aluminium or copper element which can also be in signal communication with the sensor 40 via the signal connection 42, including via wiring 43. It is further contemplated that any electronic component within the fastener drive 30, including those not illustrated, can be in signal communication with the drive electrical conductor 46.

In operation, upon engagement of the handle coupling portion 11 with the drive coupling portion 12 (FIG. 1), the handle and drive electrical conductors 45, 46 (FIGS. 2, 3) can be electrically connected to provide for signal communication between any or all of the sensor 40, processor 27, and user interface 24. In this manner, the sensor 40 can be in signal communication with at least one of the processor 27 and the user interface 24 via the signal connection 42, which can include the wiring 43, or a wireless signal connection (not illustrated) as desired.

The fastener seat 34 can also be coupled to the fastener 38 (FIG. 1), and an applied force F (FIG. 1) on the handle 20 can generate the applied torque T on the fastener 38 in order to cause rotational motion of the rotary fastener 38. In addition, the sensor 40 can sense the value 41 indicative of the applied torque T on the fastener 38. The distance D between the sensor 40 and fastener seat 34 can be sufficiently small such that the sensor 40 and fastener seat 34 have equal lever arms, or nearly equal lever arms within acceptable tolerances such as 1% or smaller. The sensed value 41 can thereby indicate the true applied torque T on the fastener 38 without need of further conversion. In addition, the inner drive ring 35 can also be utilized to more efficiently direct the applied torque T to the torque sensor 40 as described in FIG. 3. The sensor 40 can output the value 41 to the processor 27 via the handle and drive electrical conductors 45, 46. The processor 27 can determine the applied torque T, including its numerical value and unit, from the value 41, and the user interface 24 can display the applied torque T.

Figure 4:
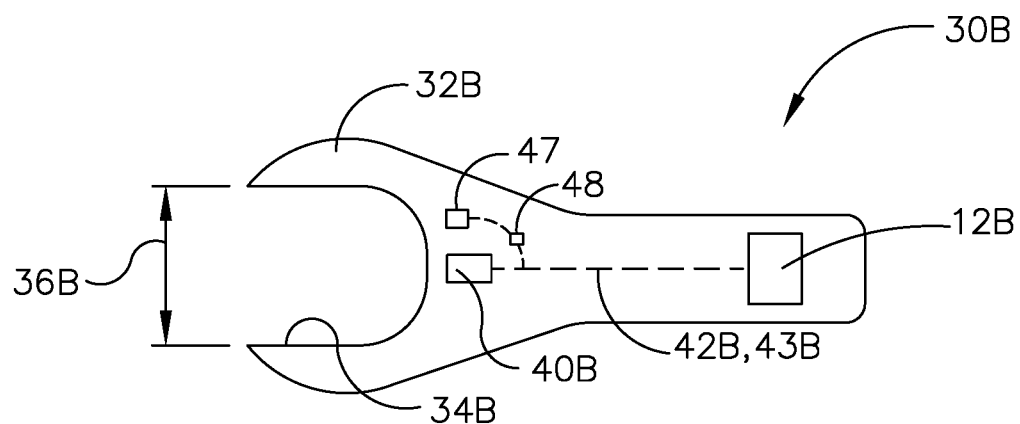
FIG. 4 illustrates an alternate fastener drive which can be utilized in the torque wrench of FIG. 1.

Turning to FIG. 4, it is contemplated that a second fastener drive 30B can also be utilized in the torque wrench 10 of FIG. 1. The second fastener drive 30B is similar to the fastener drive 30; therefore, like parts will be identified with like numerals appended with a 'B,' with it being understood that the description of the like parts of the fastener drive 30 applies to the second fastener drive 30B, unless otherwise noted.

The second fastener drive 30B includes a second head 32B in the form of a wrench head, where a second sensor 40B can be disposed on the second head 32B and configured to measure applied torque. In addition, an identifying tag 47 can also be disposed on the second head 32B including, but not limited to, a near-field communication (NFC) tag or radio-frequency identification (RFID) tag. The identifying tag 47 can be in signal communication with any or all of the controller module 25, processor 27, and the user interface 24 of FIG. 2 via a second signal connection 42B, including via second wiring 43B. In one example, the identifying tag 47 can transmit to the processor 27 a type value 48 indicative of a type or size of the second head 32B, including a second seat diameter 36B of a second fastener seat 34B of the second head 32B. In another example, the type value 48 can indicate a manufacturer of the second fastener drive 30B. In still another example, the type value 48 can indicate a maximum applied torque T that can be applied to, or via, the second head 32B. In this manner, multiple fastener drives 30, 30B each can have drive coupling portions 12 (FIG. 1) configured to detachably engage the handle coupling portion 11 (FIG. 1).

A method of indicating an applied torque T on the electronic user interface 24 of the torque wrench 10 includes generating the torque value 41 indicative of the applied torque T by the sensor 40 located adjacent the fastener seat 34, determining the applied torque T from the value 41, and displaying the applied torque T on the electronic user interface 24.

Aspects of the present disclosure provide for use of a plurality of torque wrench fastener drives which can be utilized with a common handle 20, including fastener drives of multiple sizes and types. It can be appreciated that the close proximity of the sensor to the fastener seat can eliminate the need to convert a torque value from the display to an actual applied torque on the fastener compared to traditional torque wrenches having sensors with non-negligible measurement differences from the true applied torque on the fastener. In this manner, the torque wrench as described herein provides for a consistent, uniform measurement of applied torque without need of a separate torque value conversion step, and can be utilized with a variety of fasteners and in a variety of environments.

It can be further appreciated that displaying the actual applied torque on the user interface, without need for additional calculations, can improve process efficiencies such as documentation for maintenance records. In a production or development environment, this can improve quality to both internal and external customers as well as improvement of performance metrics during testing. Aspects of the present disclosure can be adapted to a large number of assembly processes, including in a production or controlled environment.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A torque wrench for applying a torque to a fastener, the torque wrench comprising:
    a handle extending between a first end and a second end, the first end having a handle coupling portion;
    a user interface carried by the handle and indicating an applied torque on the fastener; and
    a fastener drive comprising:
        a drive coupling portion configured to detachably engage the handle coupling portion;
        a head having a fastener seat shaped to receive a fastener; and
        a sensor located on the head and proximate the fastener seat, the sensor outputting to the user interface a value indicative of the applied torque.

2. The torque wrench of claim 1 wherein the sensor is spaced 2 cm or less from the fastener seat.

3. The torque wrench of claim 1 wherein the sensor comprises one of a load cell, strain gauge, static torque sensor, or rotary torque sensor.

4. The torque wrench of claim 1 wherein the head comprises one of a wrench head, angled wrench head, box wrench head, pivoting wrench head, socket, or pivoting socket.

5. The torque wrench of claim 1 wherein the user interface comprises an electronic display.

6. The torque wrench of claim 5 further comprising a processor disposed in the handle in signal communication with at least one of the sensor and the user interface.

7. The torque wrench of claim 6 wherein the value comprises a signal.

8. The torque wrench of claim 7 wherein the signal comprises one of a voltage or electromagnetic wave.

9. The torque wrench of claim 6 wherein the sensor further comprises a wireless signal connection with at least one of the processor and the user interface.

10. The torque wrench of claim 6 wherein the handle and the drive coupling portion respectively comprise a handle electrical conductor and a drive electrical conductor.

11. The torque wrench of claim 10 wherein the handle electrical conductor and the drive electrical conductor are electrically connected upon engagement of the handle coupling portion with the drive coupling portion.

12. The torque wrench of claim 11 wherein the sensor outputs the value to the processor via the handle and drive electrical conductors.

13. The torque wrench of claim 1 further comprising an identifying tag disposed in at least one of the handle or the fastener drive and in signal communication with at least one of the user interface and the sensor.

14. The torque wrench of claim 13 wherein the identifying tag comprises a type value indicative of a type or size of fastener seat.

15. The torque wrench of claim 1 further comprising multiple fastener drives, each of the multiple fastener drives having drive coupling portions configured to detachably engage the handle coupling portion.

16. The torque wrench of claim 15 wherein a first fastener drive comprises a socket, and a second fastener drive comprises a wrench head.

17. The torque wrench of claim 16 wherein the first fastener drive further comprises a first fastener seat having an embedded drive ring.

18. The torque wrench of claim 1 wherein the handle and drive coupling portions further comprise one of a strike and catch, a magnetic coupler, an aperture with a locking pin, a clamp, or threading.

19. A method of indicating an applied torque on an electronic display of a torque wrench having a handle with a detachable fastener drive having a fastener seat, the method comprising:
- generating a torque value indicative of the applied torque by a sensor located adjacent the fastener seat;
- determining an applied torque from the torque value; and
- displaying the applied torque on the electronic display.

20. The method of claim 19 wherein the fastener seat comprises a seat diameter, and the sensor is located a distance away from the fastener seat, wherein the distance is less than 25% of the seat diameter.

* * * * *